(12) United States Patent
Zaiki

(10) Patent No.: US 9,744,893 B2
(45) Date of Patent: Aug. 29, 2017

(54) VEHICLE SEAT

(71) Applicant: TOYOTA BOSHOKU KABUSHIKI KAISHA, Aichi-ken (JP)

(72) Inventor: Noriyuki Zaiki, Fujisawa (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 36 days.

(21) Appl. No.: 14/694,277

(22) Filed: Apr. 23, 2015

(65) Prior Publication Data
US 2015/0307008 A1 Oct. 29, 2015

(30) Foreign Application Priority Data

Apr. 25, 2014 (JP) ................. 2014-091074

(51) Int. Cl.
*B60N 2/68* (2006.01)

(52) U.S. Cl.
CPC .................. *B60N 2/682* (2013.01)

(58) Field of Classification Search
CPC .... B60N 2/682; B60N 2/4808; B60N 2/4811; B60N 2/4823; B60N 2/4882; B60N 2/5858
See application file for complete search history.

(56) References Cited

U.S. PATENT DOCUMENTS

| | | | | |
|---|---|---|---|---|
| 2,650,656 A | * | 9/1953 | Ohlsson | A47C 4/02 297/440.15 |
| 3,989,298 A | * | 11/1976 | Cycowicz | A47C 4/02 297/317 |
| 5,169,211 A | * | 12/1992 | Inaba | B60N 2/4221 297/440.16 |
| 5,918,941 A | * | 7/1999 | Kigel | A47C 7/383 297/353 |
| 6,354,664 B1 | * | 3/2002 | Chen | A47C 7/402 297/353 |
| 7,832,806 B2 | | 11/2010 | Yamada | |

(Continued)

FOREIGN PATENT DOCUMENTS

| | | |
|---|---|---|
| CN | 1907753 | 2/2007 |
| FR | 2670849 | 6/1992 |

(Continued)

OTHER PUBLICATIONS

Chinese Office Action issued for Chinese Application No. 201510202209.0 including partial English-language translation, dated Oct. 24, 2016.

(Continued)

*Primary Examiner* — Timothy J Brindley
(74) *Attorney, Agent, or Firm* — Greenblum & Bernstein, P.L.C.

(57) ABSTRACT

A vehicle seat includes a bracket, a frame on which the bracket is installed, and a fixing member that is used for fixing the bracket and the frame. The bracket is provided with an engaging portion, the frame is provided with an engaged portion that is engageable with the engaging portion. By installing the fixing member to fix the bracket and the frame to each other, a state where at least a part of the engaging portion is inserted into the engaged portion or a state where at least a part of the engaged portion is inserted into the engaging portion is maintained while the bracket is elastically deformed.

17 Claims, 2 Drawing Sheets

(56) References Cited

U.S. PATENT DOCUMENTS

| | | | |
|---|---|---|---|
| 8,944,506 B2* | 2/2015 | Zeimis, III | B60N 2/682 297/331 |
| 2003/0168897 A1* | 9/2003 | Braun | B60N 2/682 297/325 |
| 2007/0029714 A1* | 2/2007 | Fisher | E05B 81/25 267/155 |
| 2007/0029860 A1 | 2/2007 | Yamada | |
| 2011/0298268 A1* | 12/2011 | Mizobata | B60N 2/682 297/452.18 |
| 2013/0140859 A1* | 6/2013 | Yamaki | B60N 2/4235 297/216.13 |
| 2013/0300177 A1* | 11/2013 | Yamada | B60N 2/44 297/423.19 |
| 2013/0341484 A1* | 12/2013 | Yamada | B60N 2/682 248/636 |
| 2015/0232009 A1* | 8/2015 | Jamieson | B60N 2/682 297/452.18 |

FOREIGN PATENT DOCUMENTS

| | | |
|---|---|---|
| JP | 62-180819 | 11/1987 |
| JP | 1-176534 | 12/1989 |
| JP | 2007-38852 | 2/2007 |
| JP | 2010-76718 | 4/2010 |

OTHER PUBLICATIONS

Japan Official Action and English translation thereof, dated Apr. 18, 2017.

* cited by examiner

VEHICLE SEAT

INCORPORATION BY REFERENCE

The disclosure of Japanese Patent Application No. 2014-091074 filed on Apr. 25, 2014, including the specification, drawings and abstract, is incorporated herein by reference in its entirety.

BACKGROUND OF THE INVENTION

1. Field of the Invention

The invention relates to a vehicle seat and, in particular, to a vehicle seat provided with a frame on which a bracket is installed.

2. Description of Related Art

Conventionally, a bracket is installed on a frame, and other members are further installed on the bracket. Under this structure, the bracket achieves the function of connecting the other members with the frame, so if the bracket loosens, the members installed on the bracket will also loosen. Thus, it is desired that a movement of the bracket relative to the frame can be inhibited. As a method for inhibiting the movement of the bracket relative to the frame, a structure that embeds a protrusion for restricting rotation in a hole for restricting rotation is disclosed in Japanese Patent Application Publication No. 2010-76718 (JP2010-76718A).

However, when the protrusion is embedded in the hole as described in JP2010-76718A, the accuracies of the hole and the protrusion are closely associated with whether or not the bracket loosens. That is, when the loosening of the bracket is to be inhibited in the technique described in JP2010-76718A, the hole and the protrusion are required to be shaped such that the protrusion is embedded in the hole without clearance. It is permitted as long as the hole and the protrusion are accurately formed, but when the sizes and the like of the hole and the protrusion are deviated, it is possible that the protrusion cannot be embedded in the hole.

SUMMARY OF THE INVENTION

The invention provides a vehicle seat in which, even if the manufacture accuracies of the frame and the bracket are not high, the loosening of the bracket relative to the frame can be inhibited.

An aspect of the invention relates to a vehicle seat, including: a bracket, a frame on which the bracket is installed, and a fixing member that is used for fixing the bracket and the frame, wherein the bracket is provided with an engaging portion, the frame is provided with an engaged portion that is engageable with the engaging portion, and by installing the fixing member to fix the bracket and the frame to each other, a state where at least a part of the engaging portion is inserted into the engaged portion or a state where at least a part of the engaged portion is inserted into the engaging portion is maintained while the bracket is elastically deformed.

According to the above aspect, the bracket is elastically deformed, and at the same time, a state where at least a part of the engaging portion is inserted into the engaged portion or a state where at least a part of the engaged portion is inserted into the engaging portion is maintained. Thus, even if the accuracy of the engaging portion or the engaged portion is not high, the state where the engaging portion is closely connected with the engaged portion is easily maintained. Thus, the circumstance where the relative positional relationship between the frame and the bracket is easily changed will not exist, and loosening can be inhibited.

In the above aspect, the fixing member may pass through the bracket and the frame.

According to the above aspect, since the fixing member is configured to pass through the bracket and the frame, a distance by which the bracket and the frame can move relatively can be restricted. Thus, even if the bracket is to be deformed due to the load acting on the fixing member, the bracket and the frame can hardly move relatively due to the applied load, and thus are easily fixed at proper positions.

In the above aspects, the bracket may be provided with a bent part at an end portion provided with the engaging portion, and by installing the fixing member, a state where at least a part of the engaging portion is inserted into the engaged portion is maintained while the bent part is elastically deformed.

According to the above aspect, deformation is likely to occur around the bent part. Thus, the desired part can be deformed, and a direction in which the force acting between the bracket and the frame is produced is easily determined.

According to the aspects of the invention, even if the manufacture accuracies of the frame and the bracket are not high, loosening of the bracket relative to the frame can be inhibited.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
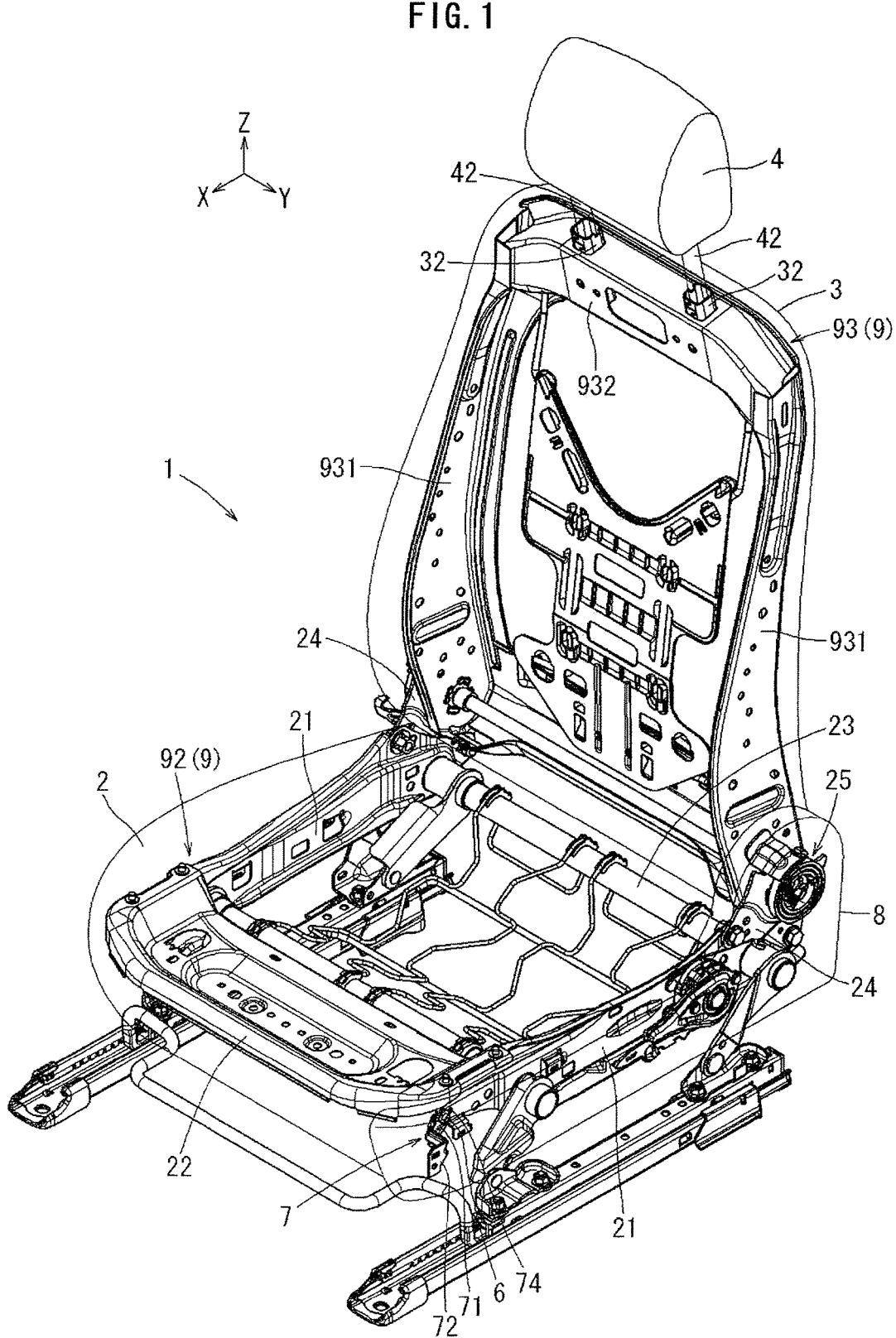
FIG. 1 is a perspective view showing a vehicle seat of an embodiment of the invention and main internal structures of the embodiment.

Example embodiments of the invention will be described below with reference to the drawings. It should be noted that with respect to directions such as a front-rear direction, an up-down direction and a left-right direction in the specification, X shown in FIG. 1 and the like is designated as a front direction, Y is designated as a left direction, and Z is designated as an up direction. For example, the side which comes into sight of a seated occupant is the front side, and the side behind the head of the seated occupant, which does not come into sight of the seated occupant, is the rear side.

A vehicle seat 1 of the embodiment is especially suitable for an automobile. The vehicle seat 1 includes: a seat cushion 2 that is provided with a supporting surface mainly opposite to thighs of a seated occupant; a seatback 3 that can move relative to the seat cushion 2 in an inclined manner and is provided with a supporting surface mainly opposite to a back of the seated occupant; and a headrest 4 that is connected with the seatback 3 and is mainly opposite to a head of the seated occupant. The vehicle seat 1 is provided with a frame 9 that forms a skeleton of the vehicle seat. The frame 9 provided at the seatback 3 is a back frame 93. The frame 9 provided at the seat cushion 2 is a cushion frame 92.

The back frame 93 is formed to be substantially U-shaped as viewed from the front. The back frame 93 in the embodiment is provided with side frames 931 that are respectively arranged on both sides, e.g., left and right sides, and an upper frame 932 connected with upper ends of the side frames 931. A holder 32 capable of maintaining a headrest support that is not shown is fixed to the upper frame 932, and the headrest 4 can be fixed by inserting a headrest support bar 42 into the headrest support.

The cushion frame 92 is formed to be substantially U-shaped as viewed from above. The cushion frame 92 in the embodiment is provided with side frames 21 that are respectively arranged on both sides, e.g., left and right side, and a front plate 22 that is connected with front ends of the side frames 21. A back pipe 23 is connected with rear end sides of the side frames 21, and is configured such that the cushion frame 92 and the back pipe 23 are formed to be substantially quadrangular as viewed from above. The rear end side of the cushion frame 92 is connected with a reclining plate 24 and a reclining mechanism 25, thereby forming a structure that connects the side frame 21 of the seat cushion 2 with the side frame 931 of the seatback 3.

In the embodiment, a bracket 7 made of metal is installed on the side frame 21 made of metal, and is formed such that a shield 8 made of resin can be installed on the bracket 7. In the vehicle seat 1 of the embodiment, a relative movement produced between the side frame 21 and the bracket 7 can be inhibited. A structure that can inhibit a relative movement of the shield 8 relative to the side frame 21 by inhibiting the relative movement between the side frame 21 and the bracket 7 is formed.

Figure 2:
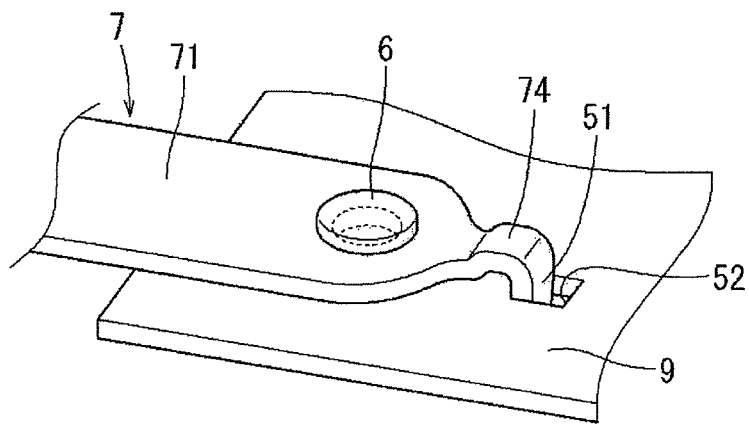
FIG. 2 is a perspective view showing a state where a fixing member is used for fixing a frame and a bracket according to the embodiment.

Next, means for inhibiting the relative movement between the frame 9 and the bracket 7 is described in detail. In the embodiment, the bracket 7 is provided with a pawl 51 that serves as an engaging portion. Moreover, the frame 9 is provided with a hole portion 52 that is engageable with the engaging portion and serves as an engaged portion. The bracket 7 and the frame 9 are fixed by a fixing member 6 so as not to be separated from each other, so an adjacent arrangement is maintained (see FIG. 2). The fixing member 6 of the embodiment is a rivet, and the bracket 7 and the frame 9 are clipped by the rivet so as to be connected such that they are prevented from being separated from each other. In particular, the fixation is performed by pressing using the rivet that serves as the fixing member 6 to elastically deform the bracket 7, and under an action of a force for restoration produced due to the elastic deformation, a comparatively large force is produced between the pawl 51 and the hole portion 52. The pawl 51 is provided with a tapered part 512 having a width getting smaller toward its front end, and a portion of the tapered part 512 is embedded in and abuts against the hole portion 52 of the frame 9. Thus, an elastic force produced due to the elastic deformation applies a force on the pawl 51 in a direction in which the pawl 51 is inserted into the hole portion 52. It is not to embed the pawl 51 into the hole portion 52 more deeply by this force, but a force that plays a role in a manner of maintaining a state where the pawl 51 is embedded relative to the hole portion 52 in an engaged state is formed. Thus, a change in a relative position between the pawl 51 and the hole portion 52 can be inhibited, and a change in a relative position between the frame 9 and the bracket 7 can be also inhibited.

Figure 3:
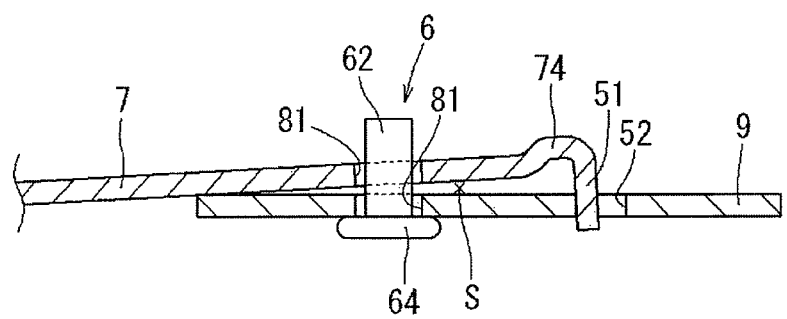
FIG. 3 is a view showing a state before the fixing member is used for fixing the frame and the bracket according to the embodiment.
Figure 4:
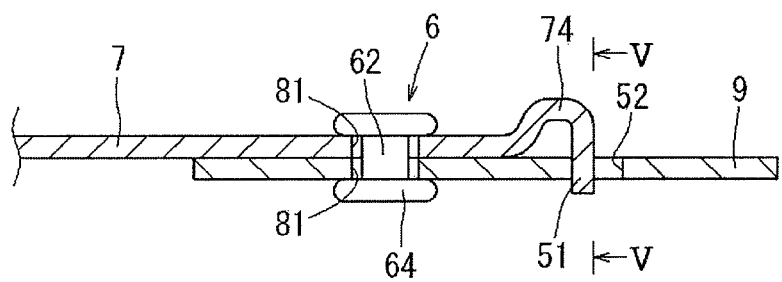
FIG. 4 is a view showing a state after the fixing member is used for fixing the frame and the bracket according to the embodiment.

The method for installing the frame 9 and the bracket 7 of the embodiment is described below. The hole portion 52 is provided at the frame 9, and is configured such that the pawl 51 of the bracket 7 is hooked in the hole portion 52. In this state, a small gap S is formed around the hole portion 52 and between the frame 9 and the bracket 7. Then, the rivet that serves as the fixing member 6 is inserted into fixing member insertion holes 81 provided at the frame 9 and the bracket 7 (see FIG. 3). The rivet is provided with a substantially cylindrical bar-shaped portion 62 and a head 64 that is connected with an end portion of the bar-shaped portion 62, and is T-shaped as viewed from the side. The rivet is a member that finally connects the frame 9 with the bracket 7, so one end side thereof can enter the fixing member insertion holes 81, and the other end side thereof cannot enter the fixing member insertion holes 81. With respect to the rivet that is inserted into the fixing member insertion holes 81 provided at the frame 9 and the bracket 7, a force is applied on an end portion of the rivet so that the rivet is deformed, so the end portion of the rivet is formed into a plate shape (see FIG. 4). The frame 9 and the bracket 7 are clipped using both the portion that is deformed into the plate shape and the head 64. In this process, a force is applied on both of the frame 9 and the bracket 7 via the rivet. The bracket 7 is more likely to be deformed than the frame 9, so the bracket 7 is more preferentially deformed than the frame 9. At this time, the gap S between the frame 9 and the bracket 7, a load applied on the fixing member 6 and the like are moderately set, so the bracket 7 stops at the elastic deformation. That is, a plastic deformation due to an excessive deformation is avoided. Moreover, the rivet is plastically deformed under a compression applied from the outside, and this state cannot be released using the elastic force from the bracket 7. Thus, even if the compression that is applied to deform the end portion of the rivet is released, the force is still applied on the frame 9 from the bracket 7, and the state where the pawl 51 is connected with the hole portion 52 can be maintained.

The bracket 7 is formed by performing machining processes such as cutting, bending and the like on a plate which is made of metal and is provided to have a substantially uniform thickness. Thus, the thickness of the bracket 7 of the embodiment is formed to be substantially uniform at any portion. Moreover, the bracket 7 that has undergone a bending process is mainly arranged to be adjacent to the frame 9, and is provided with a fixing member installation part 71 that is provided with a surface that bears a load from the fixing member 6. Moreover, in the embodiment, a bent part 74 that is bent to be substantially J-shaped as viewed from the side and that is arranged to cross a length direction of the fixing member installation part 71 is provided at an end side of the fixing member installation part 71. The bent part 74 has a structure in which an end of a substantially linear part in the character J protrudes toward the side of the frame 9 farther than the fixing member installation part 71. Moreover, an arc shaped part protrudes from the fixing member installation part 71 in a direction away from the frame 9. Moreover, the bent part 74 is formed shorter in its width direction than the fixing member installation part 71. An installation part 72 capable of installing a member is provided at the other end side of the fixing member installation part 71. The installation part 72 of the embodiment is provided with a part that extends to cross the length direction of the fixing member installation part 71 and a part that extends in parallel to the length direction of the fixing member installation part 71. The fixing member installation part 71 and the installation part 72 are formed continuously, and are formed to be substantially step-shaped in a section view. Moreover, a shield 8 can be installed on the installation part 72.

Figure 5:
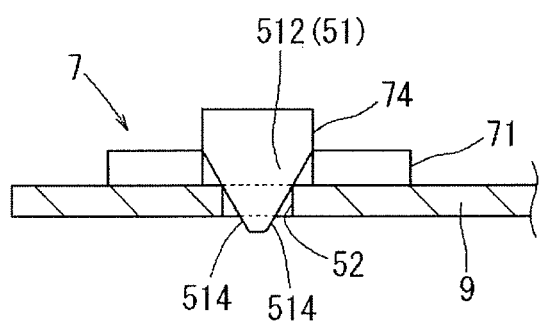
FIG. 5 is an arrow view of a V-V section in FIG. 4.

The front end of the bent part 74 is provided with the pawl 51, which has the tapered part 512 having a width getting smaller toward its end portion. The tapered part 512 is a part having a portion being capable of abutting against the frame 9 while being inserted into the hole portion 52, and positions of the frame 9 and the bracket 7 can be determined by this abutting. The tapered part 512 of the embodiment is formed to be cone-shaped as viewed from the side by being formed on its both side surfaces in the length direction with inclined surfaces 514, and can abut against the frame 9 by its both side surfaces (see FIG. 5). It should be noted that the tapered part 512 of the embodiment is formed to extend substantially perpendicular to a surface direction of the fixing member installation part 71, and can be arranged substantially in parallel to a central axis of the hole portion 52 provided at the frame 9.

The vehicle seat 1 of the embodiment includes the bracket 7, the frame 9 on which the bracket 7 is installed, and the fixing member 6 that is used for fixing the bracket 7 and the frame 9, wherein the bracket 7 is provided with an engaging portion, the frame 9 is provided with an engaged portion that is engageable with the engaging portion, and by installing the fixing member 6, the bracket 7 is elastically deformed, and at the same time, a state where at least a part of the engaging portion is inserted into the engaged portion is maintained. Thus, even if the accuracy of the engaging portion or the engaged portion is not high, the state where the engaging portion is closely connected with the engaged portion is easily maintained. Thus, the circumstance where the relative positional relationship between the frame 9 and the bracket 7 is easily changed will not exist, and loosening can be inhibited.

In addition, the fixing member 6 of the embodiment passes through the bracket 7 and the frame 9, so the distance by which the bracket 7 and the frame 9 can move relatively is restricted. Thus, even if the bracket 7 is deformed due to the load acting on the fixing member 6, the bracket 7 and the frame 9 can hardly move relatively due to the applied load, and thus are easily fixed at proper positions.

In addition, the bracket 7 of the embodiment is shaped to be provided with a bent part at an end portion provided with the engaging portion, and by installing the fixing member 6, the bent part of the bracket 7 is elastically deformed, and at the same time, a state where at least a part of the engaging portion is inserted into the engaged portion is maintained. Thus, deformation is likely to occur around the bent part. Thus, the desired part can be deformed, and a direction in which the force acting between the bracket 7 and the frame 9 is produced is easily determined.

In addition, in the embodiment, the bracket 7 is fixed at a front end side of the side frame 21. By installing the bracket 7, the shield 8 can be arranged along a side surface of the side frame 21. The front end side of the side frame 21 is a part that bears more loads from the seated occupant. According to the invention, by firmly fixing this part, the loosening of the shield 8 can be effectively inhibited.

In addition, according to the embodiment, the relative movement between the bracket 7 and the frame 9 is restricted by the resilient force of the bracket 7, there is no need to prepare additional members, which can reduce the number of the members and achieve simplification of the assembling process.

Descriptions are given above using one embodiment, but in addition to the above embodiment, the invention can be also carried out in other various manners. For example, a structure that provides the pawl at the frame and provides the hole portion at the bracket is permitted. In this case, the hole portion provided at the bracket is hooked to the pawl provided at the frame. In order that the resilient force is easily produced around the hole portion, it is permitted to provide a bent part around the hole portion, or make the thickness of the part around the hole portion be less than that of the part around the fixing member.

In addition, the pawl is not required to be a structure that is symmetrically provided with inclined surfaces at left and right sides, and can be a structure that is provided with an inclined surface only on one side. Moreover, the surface direction of the fixing member installation part and a tapering direction of the pawl are not necessarily formed to cross perpendicularly, and can also cross at a specified angle. Moreover, the direction of the width that becomes tapered is not required to be formed to be orthogonal to a straight line connecting the tapered part and the fixing member, and can be parallel to the straight line or cross the straight line at a specified angle.

In addition, the tapered part of the pawl is not necessarily provided at the end portion. Moreover, the tapered portion is not necessarily formed to depict a curve, and can be also formed to be step-shaped to be substantially formed to be tapered. Moreover, the tapered portion can also be wholly formed by providing a plurality of curved and linear parts, etc.

In addition, the fixing member is not necessarily a rivet, and can be a structure that combines outer and inner threads using a bolt and a nut or the like. But, when the fixing member is a rivet, the installation can be facilitated, and the determination of whether or not there is the circumstance where the installation state is bad and the like can be facilitated. Moreover, the hole portion is not necessarily a through hole, and can be formed into a convex shape that does not pass through.

In addition, a cross section of the hole portion that perpendicularly crosses the depth direction is not necessarily substantially quadrangular, and can be also formed to be substantially round. Any structure that applies a force on the frame from the pawl in a state where the pawl is embedded in the hole portion is permitted, and other various shapes can be formed. Moreover, the hole portion is not necessarily identically shaped in the depth direction, and the hole shape can be also formed into a frustum shape and the like.

In addition, the pawl is not necessarily formed to have a quadrangular cross section, and can be formed into a cylindrical shape, or formed to have a cross section having other polygonal shapes than the quadrangular shape, or formed into other shapes, but the pawl is preferably formed into a shape that a portion of the tapered part cannot be inserted into the hole portion in order to properly fix the tapered part that is inserted into the hole portion. According to this structure, the tapered part is pressed until it cannot further enter the hole portion, so the loosening between the frame and the bracket can be properly inhibited.

In addition, the vehicle is not limited to an automobile, and can be also a vehicle flying in the air such as an airplane or a helicopter, or a vehicle moving on or in the sea such as a vessel or a submarine.

What is claimed is:

1. A vehicle seat, comprising:
   a bracket;
   a frame on which the bracket is installed; and
   a fixing member that is used for fixing the bracket and the frame to each other, wherein the bracket is provided with an engaging portion,
   wherein the frame is provided with an engaged portion that is engageable with the engaging portion, and
   wherein, by installing the fixing member to fix the bracket and the frame to each other, a force is applied to the bracket in a direction towards the frame to elastically deform the bracket to maintain a state where at least a part of the engaging portion is inserted into the engaged portion or a state where at least a part of the engaged portion is inserted into the engaging portion, and wherein the frame is a side frame that forms a cushion frame of the vehicle seat, and wherein the bracket is fixed to a front end side of the side frame.

2. The vehicle seat according to claim 1, wherein the fixing member passes through the bracket and the side frame.

3. The vehicle seat according to claim 1, wherein the bracket is provided with a bent part at an end portion provided with the engaging portion, and wherein, by installing the fixing member, the state where at least a part of the engaging portion is inserted into the engaged portion is maintained while the bent part is elastically deformed.

4. The vehicle seat according to claim 3, wherein the bracket is provided with a pawl at a tip of the bent part, and the pawl has a tapered part having a width getting smaller toward its end portion.

5. The vehicle seat according to claim 4, wherein the tapered part has an inclined surface that is inclined relative to a direction in which the tapered part is inserted into the engaged portion, and wherein the inclined surface is capable of abutting against the engaged portion.

6. The vehicle seat according to claim 1, wherein the bracket is more likely to be deformed than the side frame when the fixing member is installed.

7. The vehicle seat according to claim 1, wherein the bracket is made of metal.

8. The vehicle seat according to claim 1, wherein the elastic deformation of the bracket applies a force on the part of the engaging portion inserted in the engaged portion in a direction in which the part of the engaging portion is inserted.

9. A vehicle seat, comprising:
a bracket having a front end and a rear end;
a frame on which the bracket is installed; and
a fixing member that is used for fixing the bracket and the frame to each other, wherein the bracket is provided with an engaging portion at the front end of the bracket,
wherein the frame is provided with an engaged portion that is engageable with the engaging portion,
wherein the fixing member is provided closer to the front end of the bracket than the rear end of the bracket, and
wherein, by installing the fixing member to fix the bracket and the frame to each other, a force is applied to the bracket in a direction towards the frame to elastically deform the bracket to maintain a state where at least a part of the engaging portion is inserted into the engaged portion or a state where at least a part of the engaged portion is inserted into the engaging portion.

10. The vehicle seat according to claim 9, wherein the fixing member passes through the bracket and the frame.

11. The vehicle seat according to claim 9, wherein the bracket is provided with a bent part at an end portion provided with the engaging portion, and wherein, by installing the fixing member, the state where at least a part of the engaging portion is inserted into the engaged portion is maintained while the bent part is elastically deformed.

12. The vehicle seat according to claim 11, wherein the bracket is provided with a pawl at a tip of the bent part, and the pawl has a tapered part having a width getting smaller toward its end portion.

13. The vehicle seat according to claim 12, wherein the tapered part has an inclined surface that is inclined relative to a direction in which the tapered part is inserted into the engaged portion, and wherein the inclined surface is capable of abutting against the engaged portion.

14. The vehicle seat according to claim 9, wherein the bracket is more likely to be deformed than the frame when the fixing member is installed.

15. The vehicle seat according to claim 9, wherein the bracket is made of metal.

16. The vehicle seat according to claim 9, wherein the frame is a side frame that forms a cushion frame of the vehicle seat, and wherein the bracket is fixed to a front end side of the side frame.

17. The vehicle seat according to claim 9, wherein the elastic deformation of the bracket applies a force on the part of the engaging portion inserted in the engaged portion in a direction in which the part of the engaging portion is inserted.

* * * * *